(12) United States Patent
Gao

(10) Patent No.: US 8,282,143 B2
(45) Date of Patent: Oct. 9, 2012

(54) POSITIONING DEVICE

(75) Inventor: Dong-Wei Gao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 177 days.

(21) Appl. No.: 12/868,925

(22) Filed: Aug. 26, 2010

(65) Prior Publication Data

US 2011/0156415 A1      Jun. 30, 2011

(30) Foreign Application Priority Data

Dec. 28, 2009  (CN) .......................... 2009 1 0312409

(51) Int. Cl.
*B66C 1/54*    (2006.01)
*B25J 15/00*   (2006.01)

(52) U.S. Cl. ........................................ 294/95; 294/97

(58) Field of Classification Search ................. 294/195, 294/95, 97; 279/2.1, 2.11, 2.12, 2.13, 2.24
See application file for complete search history.

(56) References Cited

U.S. PATENT DOCUMENTS

| | | | | |
|---|---|---|---|---|
| 1,197,648 A | * | 9/1916 | Meyers | 433/158 |
| 1,652,857 A | * | 12/1927 | Greve | 29/266 |
| 1,958,330 A | * | 5/1934 | Beard | 29/255 |
| 3,731,364 A | * | 5/1973 | Romero | 29/240 |
| 4,032,185 A | * | 6/1977 | Peyton | 294/97 |
| 4,068,879 A | * | 1/1978 | Torbet et al. | 294/89 |
| 4,377,956 A | * | 3/1983 | Cooper | 81/444 |
| 4,863,205 A | * | 9/1989 | Schron et al. | 294/82.28 |

* cited by examiner

*Primary Examiner* — Dean Kramer

(74) *Attorney, Agent, or Firm* — Altis Law Group, Inc.

(57) ABSTRACT

A positioning device for a cylindrical component includes a main body defining a cylindrical channel; at least two positioning assemblies are rotatably fixed to an end of the main body; and a push rod movably fixed in the cylindrical channel of the main body to rotate the at least two positioning assemblies outwards to position the cylindrical channel of the cylindrical component.

14 Claims, 4 Drawing Sheets

POSITIONING DEVICE

BACKGROUND

1. Technical Field

The present disclosure generally relates to robotics and, particularly, to a positioning device applied to a cylindrical component for robotics.

2. Description of Related Art

A frequently used robot includes a first cylindrical component and a second cylindrical component connected thereto via a plurality of fasteners. Each of the first and second cylindrical components defines a cylindrical channel. Because the first and second cylindrical components are rotatable, and are assembled with the fasteners, one of the first and second cylindrical components must be fixed. However, due to size and weight of the cylindrical components, it is difficult to find the appropriate locations, such as, for example, an outer side or two ends of the cylindrical components, by which the cylindrical component can be positioned using typical positioning devices.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
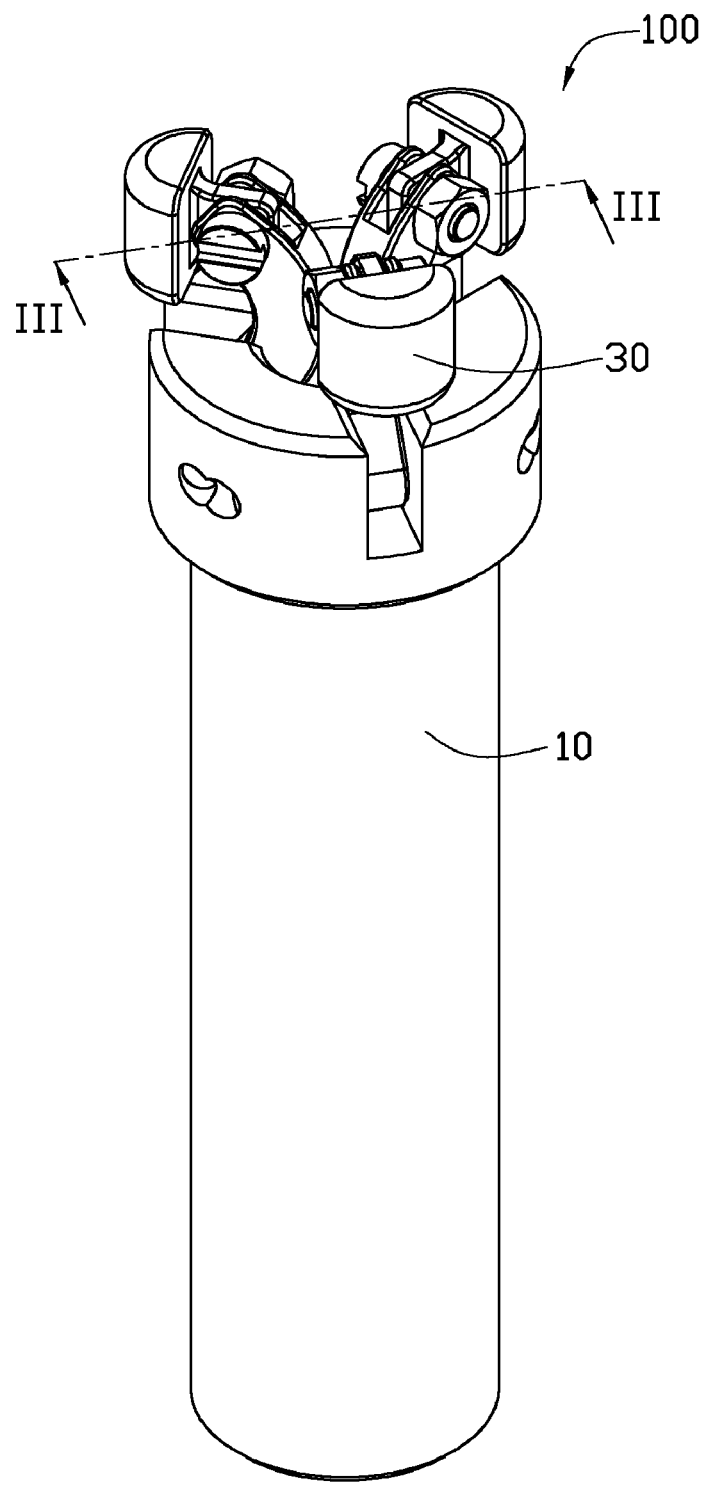
FIG. 1 is an assembled, isometric view of an embodiment of a positioning device, the positioning device including a positioning assembly.
Figure 2:
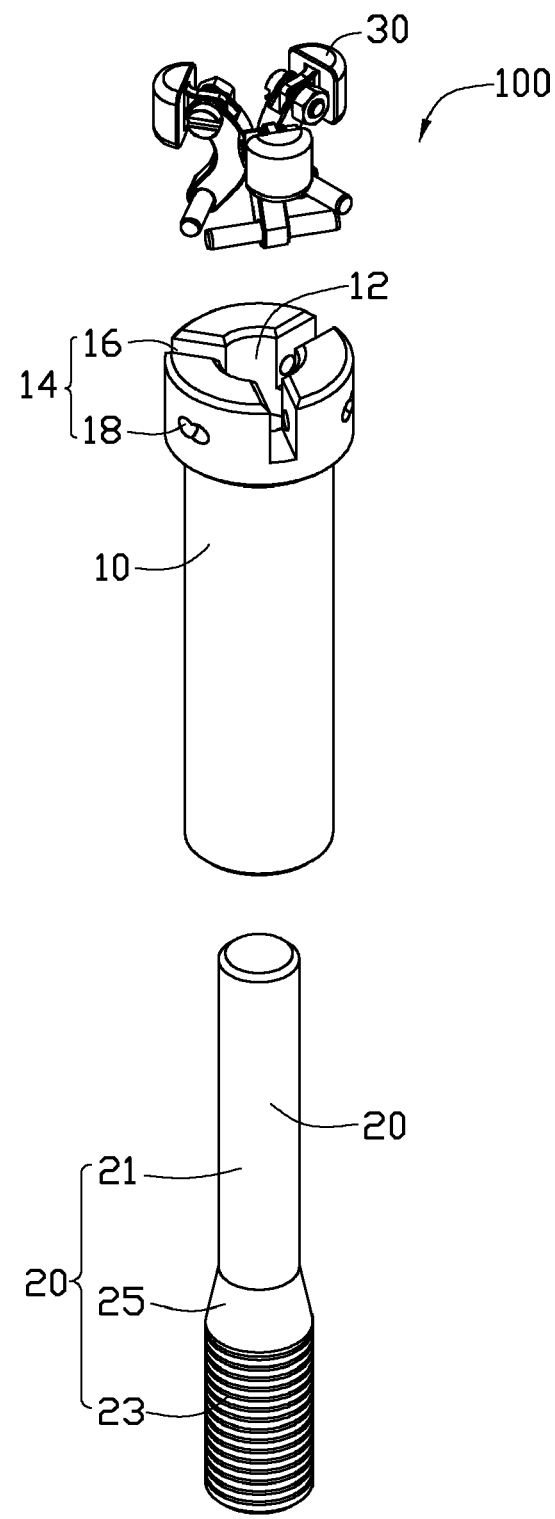
FIG. 2 is a partially exploded, isometric view of the positioning device of FIG. 1.

Referring to FIGS. 1 and 2, a positioning device 100 of the disclosure includes a main body 10, a push rod 20 and three positioning assemblies 30. The main body 10 is substantially a cylinder defining a cylindrical channel 12 along a center axis of the main body 10. The three positioning assemblies 30 are rotatably fixed to an end of the main body 10. The push rod 20 is movably fixed in the cylindrical channel 12 of the main body 10 to rotate the positioning assemblies 30 outwards to position a first cylindrical channel of a cylindrical component.

In the illustrated embodiment, the main body 10 further includes a mounting portion 14 formed at an end of the main body 10. The mounting portion 14 is also substantially a cylinder, and having an outer diameter which exceeds that of the main body 10. The cylindrical channel 12 of the main body 10 extends through the mounting portion 14. The main body 10 further includes three limiting depressions 16 separately defined at an end surface of the mounting portion 14. Each limiting depression 16 communicates with the cylindrical channel 12 and extends through an outer side surface of the mounting portion 14. Angles defined by two adjacent limiting depressions 16 equal 60°. The main body 10 further includes three pin holes 18. Each pin hole 18 extends through a corresponding limiting depression 16. Three pin holes 18 cooperatively define a substantially isosceles triangle.

Figure 3:
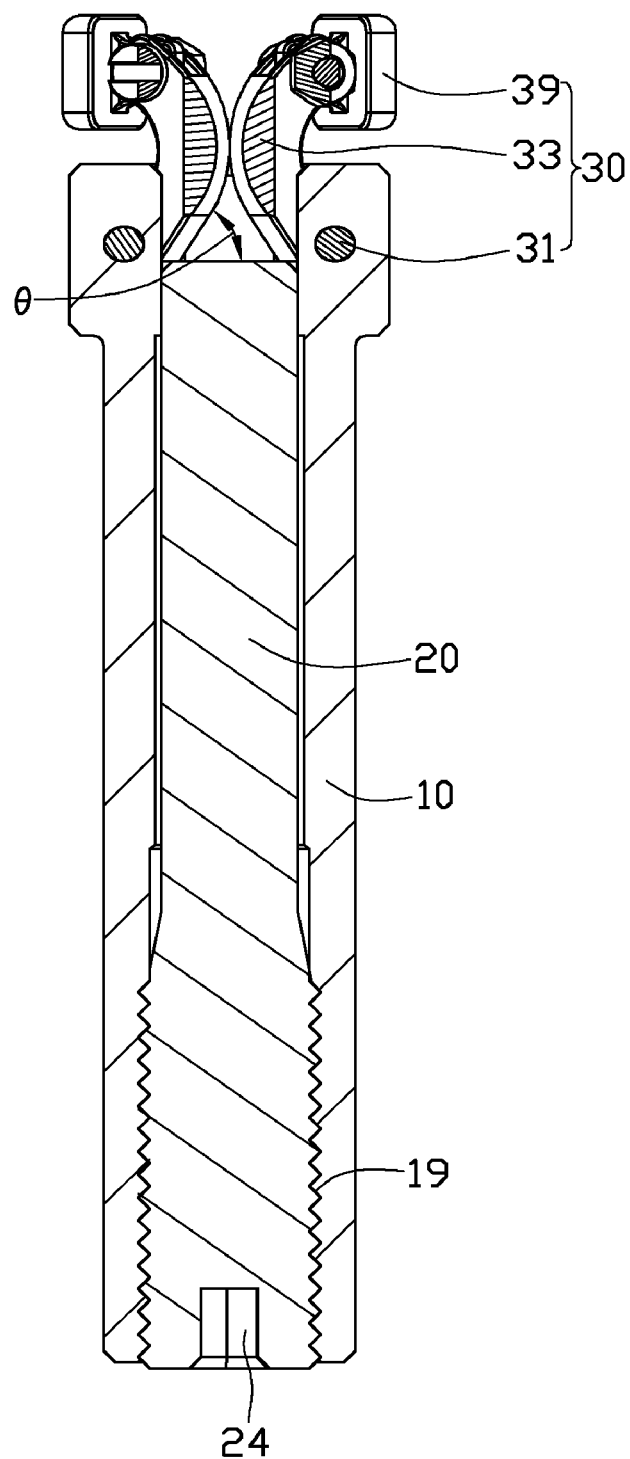
FIG. 3 is a cross-section of the positioning device of FIG. 1, taken along line III-III.
Figure 4:
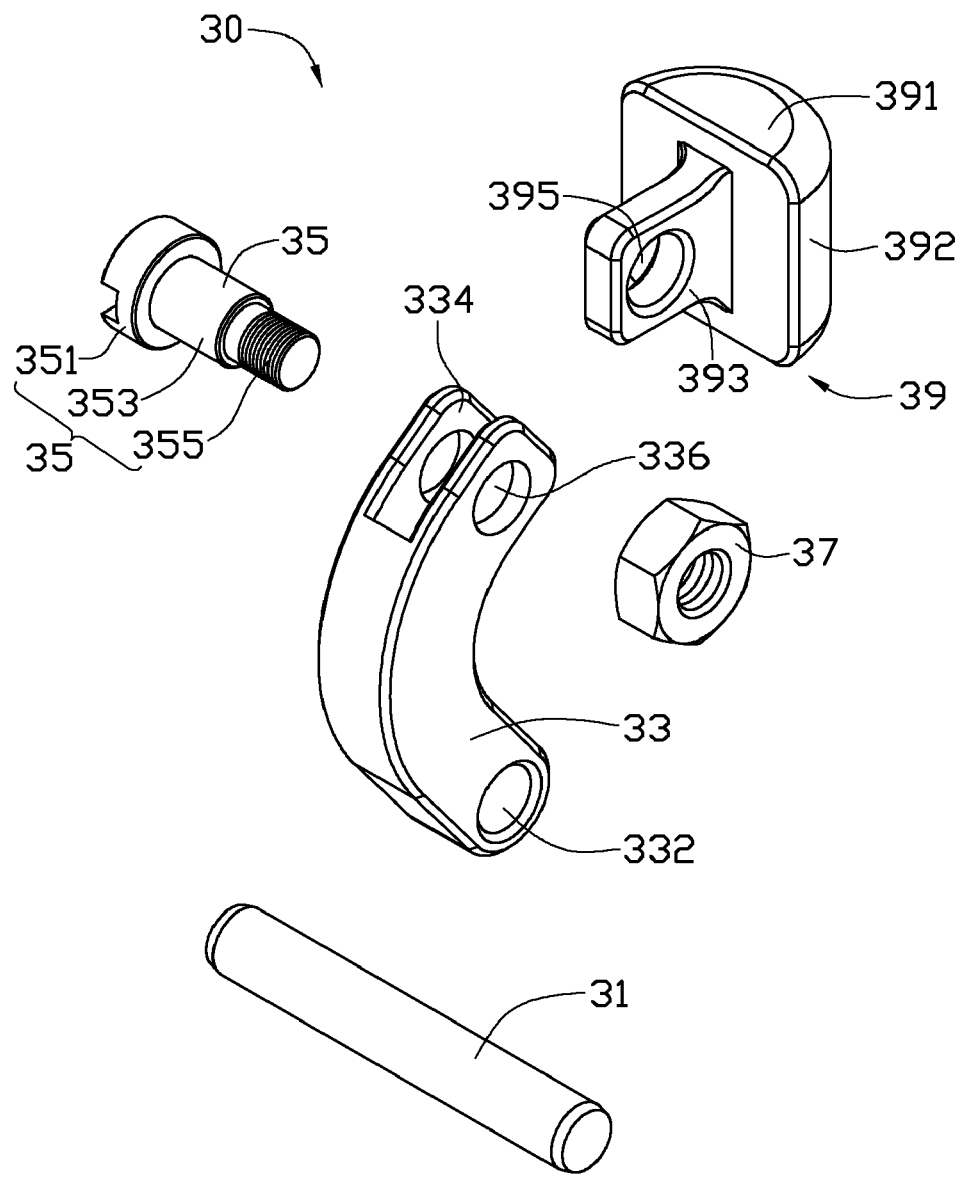
FIG. 4 is an enlarged, exploded, isometric view of the positioning assembly of the positioning device of FIG. 1.

Referring to FIGS. 3 and 4, each positioning assembly 30 includes a pin 31, a curved connecting shaft 33, a fastener 35, a threaded retainer 37 and a positioning block 39.

The curved connecting shaft 33 defines a first through hole 332 at one end of the curved connecting shaft 33 to assemble with the pin 31. The curved connecting shaft 33 further includes a pair of protruding ears 334 separately extending outward from the other end of the curved connecting shaft 33 away from the first through hole 332. The two protruding ears 334 are located corresponding to each other. Each of the two protruding ears 334 defines a second through hole 336. The two second through holes 336 are also located corresponding to each other. In the illustrated embodiment, the curved connecting shaft 33 is substantially semicircular in shape.

The positioning block 39 includes a positioning body 391 and a connecting end 393 connected to the positioning body 391. The positioning body 391 defines a cylindrical surface 392 away from the connecting end 393. The connecting end 393 defines a third through hole 395. The positioning body 391 is preferably made of elastic materials, such as rubber.

The fastener 35 includes a blocking portion 351, a middle portion 353 and a threaded portion 355. The middle portion 353 interconnects the blocking portion 351 and the threaded portion 355. Diameters of the blocking portion 351, the middle portion 353 and the threaded portion 355 decrease in that order.

The connecting end 393 of the positioning block 39 is located between the pair of protruding ears 334. The fastener 35 passes through one of the second through holes 336, the third through hole 395, and the other of the second through holes 336 in that order, and is finally secured with the threaded retainer 37 by the threaded portion 355 to fix the positioning block 39. It should be pointed out that an angle defined by the positioning block 39 relative to the curved connecting shaft 33 can be adjusted by the fastener 35 and the threaded retainer 37. For example, when the fastener 35 is not secured with the threaded retainer 37 tightly, the positioning block 39 can be subjected to external force to rotate relative to the curved connecting shaft 33.

The pin 31 is a rod, and the size and shape of which is matched to the pin hole 18. An end of the curved connecting shaft 33 defining the first through hole 332 is positioned in the corresponding limiting depression 16, and the pin 31 passes through the corresponding pin hole 18 and the first through hole 332, such that the positioning assemblies 30 are rotatably fixed on the mounting portion 14. In use, the curved connecting shaft 33 can be limited by the limiting depression 16; and the positioning block 39 and the curved connecting shaft 33 can be rotated relative to a rotary axis defined by the pin 31.

Referring to FIG. 2 again, the push rod 20 includes a pushing portion 21, an outer threaded portion 23, and a connecting portion 25 interconnecting the pushing portion 21 and the outer threaded portion 23. The pushing portion 21 and the outer threaded portion 23 of the push rod 20 are substantially cylindrical in shape. In the illustrated embodiment, a diameter of the outer threaded portion 23 exceeds that of the pushing portion 21. The connecting portion 25 is a substantially conical frustum. The push rod 20 further defines a hexagonal groove 24 defined in an end surface adjacent to the outer threaded portion 23 of the push rod 20. The hexagonal groove 24 is configured to conveniently control the push rod 20 with a hexagon spanner.

Referring to FIG. 3 again, the main body 10 further includes an inner threaded portion 19 defined on an inner surface of the cylindrical channel 12 adjacent to an end of the main body 10 away from the positioning assemblies 30. When the push rod 20 is received in the cylindrical channel 12 of the main body 10, the pushing portion 21 approaches the mounting portion 14, and the outer threaded portion 23 of the push rod 20 is threadedly secured with the inner threaded portion 19 of the main body 10. In use, the push rod 20 can be moved toward the mounting portion 14 by rotating the hexagon spanner, at the same time, the pushing portion 21 pushes the three curved connecting shafts 33 to rotate outward until the cylindrical surfaces 392 of the positioning blocks 39 firmly press against the inner cylindrical surface of the cylindrical component. Thus, the cylindrical component is positioned by the positioning device 100.

As shown in FIG. 3, the positioning device 100 is in an original state. Angle θ represents an angle of an outer surface of the curved connecting shaft 33 relative to a horizontal surface (a top surface of the pushing portion 21). The angle θ can be adjusted by controlling the length and the curvature of the curved connecting shaft 33. The movement of the positioning blocks 39 depends on the length and the curvature of the curved connecting shaft 33. In order to achieve the maximum amount of pressure applied to the inner cylindrical surface of the cylindrical component, the cylindrical surfaces 392 of the positioning blocks 39 and the inner cylindrical surface of the cylindrical component should be parallel to a center axis of the main body 10 of the positioning device 100.

In an alternative embodiment, the mounting portion 14 of the main body 10 can be omitted, as long as the positioning assemblies 30 are rotatably fixed to an end of the main body 10. The positioning blocks 39 are fixed to the curved connecting shaft 33 by welding or glue.

It should further be noted that the configurations of the positioning assembly 30 is not limited to the embodiments described. The number and configuration of the positioning assembly 30 are specifically described and illustrated for the purpose of exemplifying various aspects of the present positioning device 100. For example, at least two positioning assemblies 30 can be deployed.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A positioning device for positioning a cylindrical component defining a first cylindrical channel, comprising:
   a main body defining a cylindrical channel, the main body comprising a mounting portion formed at an end of the main body, the cylindrical channel of the main body extending through the mounting portion, the main body further defining at least two limiting depressions separately defined at an end surface of the mounting portion, and at least one pin hole extending through a corresponding limiting depression;
   at least two positioning assemblies rotatably fixed to an end of the main body, each positioning assembly comprising a pin and a curved connecting shaft; an end of the curved connecting shaft defining a first through hole positioned in the corresponding limiting depression, and the pin passing through the corresponding pin hole and the first through hole, the curved connecting shaft further comprising a pair of protruding ears separately extending outward from the end of the curved connecting shaft away from the first through hole, wherein each of the two protruding ears defining a second through hole; and
   a push rod movably fixed in the cylindrical channel of the main body to rotate the at least two positioning assemblies outwards to position the cylindrical channel of the cylindrical component.

2. The positioning device of claim 1, wherein the mounting portion is substantially a cylinder, an outer diameter of the mounting portion exceeds the outer diameter of the main body.

3. The positioning device of claim 1, wherein each limiting depression communicates with the cylindrical channel and extends through an outer side surface of the mounting portion.

4. The positioning device of claim 3, wherein three limiting depressions and three pin holes are defined, a plurality of angles defined by adjacent limiting depressions equal 60°, and three pin holes cooperatively define a substantially isosceles triangle.

5. The positioning device of claim 1, wherein the curved connecting shaft is substantially semicircular.

6. The positioning device of claim 1, wherein each positioning assembly further comprises a positioning block, a fastener and a threaded retainer; the positioning block comprises a positioning body and a connecting end, the connecting end connected to the positioning body, the positioning body defines a cylindrical surface away from the connecting end, and the connecting end defines a third through hole; the fastener passes through one of the second through holes, the third through hole, and the other of the second through holes in that order, and is secured with the threaded retainer by the threaded portion to fix the positioning block.

7. The positioning device of claim 6, wherein the positioning body is rubber.

8. The positioning device of claim 6, wherein the fastener comprises a blocking portion, a middle portion and a threaded portion; the middle portion interconnects the blocking portion and the threaded portion; and the diameters of the blocking portion, the middle portion and the threaded portion decrease in that order.

9. The positioning device of claim 6, wherein the cylindrical surface of the positioning body of the positioning block is parallel to a center axis of the main body.

10. The positioning device of claim 1, wherein the push rod comprises a pushing portion, an outer threaded portion, and a connecting portion interconnecting the pushing portion and the outer threaded portion.

11. The positioning device of claim 10, wherein a diameter of the outer threaded portion of the push rod exceeds that of the pushing portion.

12. The positioning device of claim 11, wherein the push rod further comprises a hexagonal groove defined in an end surface adjacent to the outer threaded portion of the push rod.

13. The positioning device of claim 10, wherein the main body further comprises an inner threaded portion defined on an inner surface of the cylindrical channel adjacent to an end of the main body away from the at least two positioning assemblies; the pushing portion approaches the mounting portion, and the outer threaded portion of the push rod is threadedly secured with the inner threaded portion of the main body.

14. A positioning device for positioning a cylindrical component defining a first cylindrical channel, comprising:
   a main body defining a cylindrical channel, the main body further defining at least two limiting depressions separately defined at an end surface of the main body, and at least one pin hole extending through a corresponding limiting depression;

at least two positioning assemblies rotatably fixed to an end of the main body, each positioning assembly comprising a pin and a curved connecting shaft; an end of the curved connecting shaft defining a first through hole positioned in the corresponding limiting depression, and the pin passing through the corresponding pin hole and the first through hole, the curved connecting shaft further comprising a pair of protruding ears separately extending outward from the end of the curved connecting shaft away from the first through hole, wherein each of the two protruding ears defining a second through hole; and a push rod movably fixed in the cylindrical channel of the main body to rotate the at least two positioning assemblies outwards to position the cylindrical channel of the cylindrical component.

* * * * *